US011535526B2

(12) United States Patent
Kent

(10) Patent No.: US 11,535,526 B2
(45) Date of Patent: *Dec. 27, 2022

(54) MULTI-LEVEL OUTLET WEIR FOR ENHANCED VOLUMETRIC SEPARATION FOR STORMWATER TREATMENT

(71) Applicant: Bio Clean Environmental Services, Inc., Oceanside, CA (US)

(72) Inventor: Zachariha J. Kent, Fair Oaks Ranch, TX (US)

(73) Assignee: Bio Clean Environmental Services, Inc., Oceanside, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/062,518

(22) Filed: Oct. 2, 2020

(65) Prior Publication Data

US 2021/0017041 A1 Jan. 21, 2021

Related U.S. Application Data

(63) Continuation-in-part of application No. 16/505,275, filed on Jul. 8, 2019, now Pat. No. 11,261,595.

(60) Provisional application No. 62/909,619, filed on Oct. 2, 2019.

(51) Int. Cl.
*E03F 5/14* (2006.01)
*C02F 1/00* (2006.01)
*B01D 21/24* (2006.01)
*B01D 21/00* (2006.01)
*C02F 103/00* (2006.01)

(52) U.S. Cl.
CPC ............ *C02F 1/00* (2013.01); *B01D 21/0024* (2013.01); *B01D 21/2444* (2013.01); *E03F 5/14* (2013.01); *C02F 2001/007* (2013.01); *C02F 2103/001* (2013.01)

(58) Field of Classification Search
CPC ... E03F 5/14; B01D 21/0003; B01D 21/0024; B01D 21/0087; B01D 21/2433; B01D 21/2444
USPC ....................... 210/170.03, 532.1, 540, 747.2
See application file for complete search history.

(56) References Cited

U.S. PATENT DOCUMENTS

| | | | | |
|---|---|---|---|---|
| 1,793,599 | A * | 2/1931 | Egan | E03F 5/046 210/170.03 |
| 2,118,157 | A * | 5/1938 | Camp | B01D 21/2444 210/800 |
| 5,849,181 | A * | 12/1998 | Monteith | E03F 5/0401 210/170.03 |
| 6,062,767 | A * | 5/2000 | Kizhnerman | E03F 5/16 210/170.03 |
| 7,276,156 | B2 * | 10/2007 | Lockerman | E03F 5/0404 210/170.03 |
| 7,686,961 | B1 * | 3/2010 | Glynne | E03F 5/14 210/170.03 |
| 10,344,466 | B2 * | 7/2019 | Kent | E03F 5/14 |
| 2019/0264717 | A1 * | 8/2019 | Chamberlain | E03F 5/14 |
| 2019/0330836 | A1 * | 10/2019 | Kent | E03F 5/14 |

\* cited by examiner

*Primary Examiner* — Christopher Upton
(74) *Attorney, Agent, or Firm* — Steven W. Webb

(57) ABSTRACT

A method, system, and apparatus directed to an innovative approach for the treatment of stormwater utilizing hydrodynamic separator assembly designed to maximize flow movement for more efficient sediment removal and maximize water flow control.

14 Claims, 14 Drawing Sheets

Structure Dimensions

| Sump Depth (ft) | Inlet/Outlet Pipe Size (ft) | Structure Area (sq ft) |
|---|---|---|
| 3 | 2 | 12.56 |

Separator with No Orifice Control Outlet Weir (45)

| HGL Above Outlet Pipe Invert (ft) | Wet Volume (cu ft) | Loading Rate (gpm/cu ft) |
|---|---|---|
| 0.11 | 39.0816 | 0.574 |
| 0.16 | 39.6896 | 1.131 |
| 0.26 | 40.9456 | 2.740 |
| 0.37 | 42.3272 | 5.303 |
| 0.45 | 43.333 | 7.768 |
| 0.52 | 44.2112 | 10.151 |
| 0.59 | 45.0904 | 12.442 |
| 0.75 | 47.1 | 19.057 |
| 1.23 | 53.1288 | 42.237 |
| 1.82 | 60.5392 | 74.134 |

Separator With Orifice Control Outlet Weir

| HGL Above Outlet Pipe Invert (ft) | Wet Volume (cu ft) | Loading Rate (gpm/cu ft) |
|---|---|---|
| 0.5 | 43.96 | 0.510 |
| 0.75 | 47.1 | 0.953 |
| 1 | 50.24 | 2.233 |
| 1.25 | 53.38 | 4.204 |
| 1.5 | 56.52 | 5.955 |
| 2 | 62.8 | 7.146 |
| 2.25 | 65.94 | 8.508 |
| 2.5 | 69.08 | 12.994 |
| 2.75 | 72.22 | 31.672 |
| 3 | 75.36 | 59.534 |

MULTI-LEVEL OUTLET WEIR FOR ENHANCED VOLUMETRIC SEPARATION FOR STORMWATER TREATMENT

CROSS-REFERENCE TO RELATED APPLICATIONS

The present application is a non-provisional application of U.S. Provisional Application No. 62/909,619, filed Oct. 2, 2019 and a continuation in part of U.S. Nonprovisional application Ser. No. 16/505,275 filed Jul. 8, 2019.

FIELD OF THE INVENTION

The embodiments of the present technology relate in general enhanced pollutant removal of particulates for the application of stormwater treatment.

The present invention provides a concept and method for providing enhanced pollutant removal for particulates for the application of stormwater treatment. Said invention utilizes an innovative multi-level orifice outlet flow control weir inside a box or manhole structure for removal of sediments and other particulate pollutants.

Current stormwater separators use various internal components, such as baffles, walls, round cylinders, down pipes, oil skimmers, and other internal mechanism to control the flow and or flow path of water that travels through it in an attempt to maximize sediment removal. Some devices have down pipes or up pipes within the internals that aim to control the flow in a certain path to increase sediment removal. This is known as water path maximization which allows for more time for finer particulates to fall out of suspension.

While there are other various inventions taught in the prior art which provide the benefit of increasing performance of particulate removal, their inherent limitations are based on a simplistic flow control design using a single flow path through the system for all flow rates or two flow paths, one for treated flows and one for higher bypass flows. None of these systems aim to provide better control of water level at different flows, and leveraging that increased water level to increase the wet volume of the system and thus maximize volumetric separation over a range of flow rates to maximize overall performance.

Testing has proven that the same treatment system, with a multi-level orifice control outlet weir provides a substantial increase in performance over the system without the orifice control outlet weir (See FIGS. 13 and 14). This has been proven based independent testing done a baffle box system tested under the New Jersey Department of Environmental Protection protocol for hydrodynamic separators.

BACKGROUND

Water treatment systems have been in existence for many years. These systems treat stormwater surface runoff or other polluted water. Stormwater runoff is of concern for two main reasons: i. volume and flow rate, and ii. pollution and contamination. The volume and flow rate of stormwater runoff is a concern because large volumes and high flow rates can cause erosion and flooding. Pollution and contamination of stormwater runoff is a concern because stormwater runoff flows into our rivers, streams, lakes, wetlands, and/or oceans. Pollution and contamination carried by stormwater runoff into such bodies of water can have significant adverse effects on the health of ecosystems.

In the early 2000s the EPA and California Regional Water Quality Boards issued what is known as a Total Maximum Daily Load for trash in the Los Angeles Region, specifically the Los Angeles River Watershed. Countless studies were done on the river and its discharge into the Pacific Ocean. It was found that the amount of trash entering the river basin from the storm water infrastructure far exceeded any acceptable levels. There were several environmental groups advocating for action to be taken to reduce the amount of trash discharged into the river and other watersheds.

The Clean Water Act of 1972 enacted laws to improve water infrastructure and quality. Sources of water pollution have been divided into two categories: point source and non-point source. Point sources include wastewater and industrial waste. Point sources are readily identifiable, and direct measures can be taken to mitigate them. Non-point sources are more difficult to identify. Stormwater runoff is the major contributor to non-point source pollution. Studies have revealed that contaminated stormwater runoff is the leading cause of pollution to our waterways. As we build houses, buildings, parking lots, roads, and other impervious areas, we increase the amount of water that runs into our stormwater conveyance systems and eventually flows into rivers, lakes, streams, wetlands, and/or oceans. As more land becomes impervious, less rain seeps into the ground, resulting in less groundwater recharge and higher velocity flows, which cause erosion and increased pollution levels of watery environments.

Numerous sources introduce pollutants into stormwater runoff Sediments from hillsides and other natural areas exposed during construction and other human activities are one source of such pollutants. When land is stripped of vegetation, stormwater runoff erodes the exposed land and carries it into storm drains. Trash and other debris dropped on the ground are also carried into storm drains by stormwater runoff. Another source of pollutants is leaves and grass clippings from landscaping activities that accumulate on hardscape areas and do not decompose back into the ground, but flow into storm drains and collect in huge amounts in lakes and streams. These organic substances leach out large amounts of nutrients as they decompose and cause large algae blooms, which deplete dissolved oxygen levels in marine environments and result in expansive marine dead zones. Unnatural stormwater polluting nutrients include nitrogen, phosphorus, and ammonia that come from residential and agricultural fertilizers.

Heavy metals that come from numerous sources are harmful to fish, wildlife, and humans. Many of our waterways are no longer safe for swimming or fishing due to heavy metals introduced by stormwater runoff. Heavy metals include zinc, copper, lead, mercury, cadmium, and selenium. These metals come from vehicle tires and brake pads, paints, galvanized roofs and fences, industrial activities, mining, recycling centers, etc. Hydrocarbons are also of concern and include oils, gas, and grease. These pollutants come from leaky vehicles and other heavy equipment that use hydraulic fluid, brake fluid, diesel, gasoline, motor oil, and other hydrocarbon-based fluids. Bacteria and pesticides are additional harmful pollutants carried into waterways by stormwater runoff.

Over the last 20 years, the Environmental Protection Agency (EPA) has been monitoring the pollutant concentrations in most streams, rivers, and lakes in the United States. Over 50% of waterways in the United States are impaired by one of more of the above-mentioned pollutants. As part of the EPA Phase 1 and Phase 2 National Pollutant Discharge Elimination Systems, permitting requirements intended to control industrial and nonindustrial development activities have been implemented. Phase 1 was initiated in 1997 and Phase 2 was initiated in 2003. While there are many requirements for these permits, the main requirements focus on pollution source control, pollution control during construction, and post construction pollution control. Post construction control mandates that any new land development or redevelopment activities incorporate methods and solutions that both control increased flows of surface water runoff from the site and decrease (filter out) the concentration of pollutants off the site. These requirements are commonly known as quantity and quality control. Another part of these requirements is for existing publicly owned developed areas to retrofit the existing drainage infrastructure with quality and quantity control methods and technologies that decrease the amount of surface water runoff and pollutant concentrations therein.

SUMMARY OF THE INVENTION

A hydrodynamic separation device for stormwater or other wastewaters primarily utilizing the forces of gravity and buoyancy to remove particulates from water flows within a an enclosed chamber having one or more inlets and outlets on the sides, tops, or bottoms of the chamber. The device utilizing a unique and revolutionary approach of one or more outlet orifice controls to precisely control the water level and discharge rate out of the system at various inlet flow ranges such as dry weather flow, low flow wet weather, medium flow wet weather, high flow wet weather and other conditions. This unique hydraulic approach allows the designers to decide and optimize the desired removal efficiencies of pollutants such as sediments at known flow ranges to better control the performance curve. General sediment removal performance curves are mostly linear. The addition of multi-level orifice controls on the outlet create a more tiered or terraced performance curve therefore maintaining a higher performance level through a wider ranges of flows. The orifice controls also enhance the increase the general volume of water in the system to increase the wet volume of water in the system which also further improves performance via increased retention time. The combination of enhanced flow and volume control lead to a better overall hydrodynamic separator.

DETAILED DESCRIPTION

Figure 1:
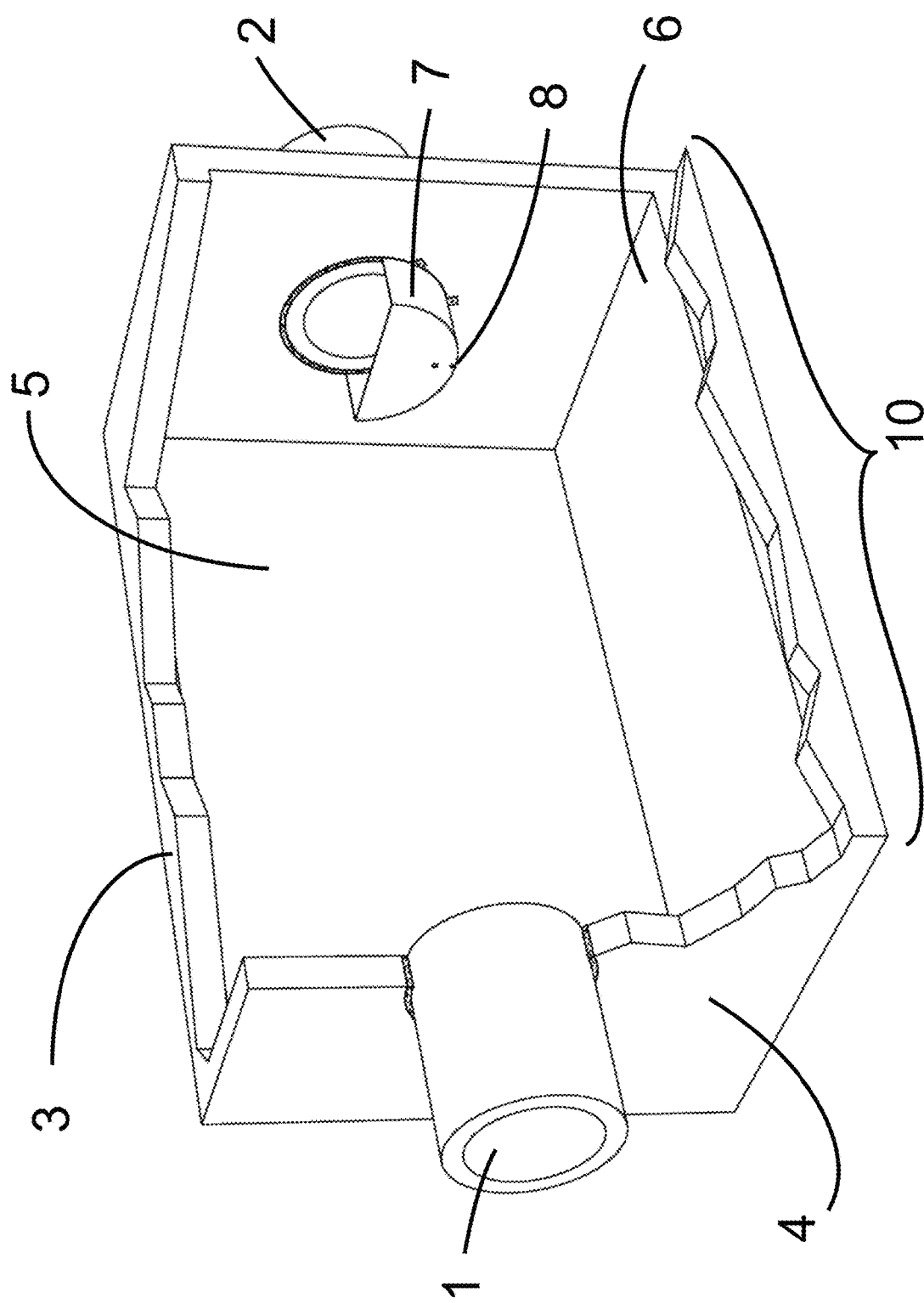
FIG. 1 is a cut-away view of a preferred embodiment of a hydrodynamic separation device clearly identifying different potential locations of orifices on outlet weirs.

After reading this description it will become apparent to one skilled in the art how to implement the invention in various alternative embodiments and alternative applications. However, all the various embodiments of the present invention will not be described herein. It is understood that the embodiments presented here are presented by way of an example only, and not limitation. As such, this detailed description of various alternative embodiments should not be construed to limit the scope or breadth of the present invention as set forth below.

Hydrodynamic separators of various shapes utilize a permanent standing water pool to settle and efficiently store captured sediments such as total suspended solids deep enough so they are not scoured out. All systems require the water level to return to the invert of the outlet pipe between storm events as water cannot be allowed to back up into the inlet pipe and submerge the drainage system upstream. Because of this inherent design the size of the outlet pipe is generally the limiting point of flow restriction during high flows. During low flows it does nothing to control the flow through the system and thus there is no difference between the hydraulic grade line (water level) in and hydraulic grade line (water level) out. Therefore, the volume inside system (wet volume of water) is not increased at the lower flow rates. Therefore, performance is not maximized at these lower flow rates because the volume increase is minimal.

The present invention utilizes a weir placed around the outlet pipe. The invention has at least one weir at the bottom that allows the water level to drain back down to the invert of the outlet pipe after a rain event. It also decreases the discharge rate for very low and dry weather flows by backing the water level up behind the weir, increasing volume, slowing the discharge rate, which increase performance. The higher the volume and the lower the loading rate (gpm/sq ft settling surface area) the better the particulate removal. With a single bottom orifice the volume in the system is increased up to and above the peak treatment flow rate as the HGL through the system is substantially higher than it would be without (if only controlled by the size of the outlet pipe). It should be noted that the outlet pipe must be kept big to handle the peak bypass flow rate so using a smaller outlet pipe is not an option. The orifice control weir allows a large pipe to be used while at the same time backing up the water to increase volume, reduce loading rate, and increase performance.

Additionally, one more or more orifices can be added on the side wall of the outlet control orifice weir to provide flow control and set HGLs at different flow rates in a more linear fashion versus uncontrolled discharge. The loading rate can be manipulated to stay lower for longer in proportion to the increase of volume. The volumetric loading rate is controlled as well and improves performance. Volumetric loading is the wet volume of water divided by the flow rate through the system. Testing has shown that the volumetric loading rate is a more accurate in scaling performance than surface area loading and thus the volumetric control of this weir concept with one or more orifices added to a box or round structure used for separation provides real benefit.

Flow control through the hydrodynamic separation chamber is important in order to control target flow rates. Surface loading rate and hydraulic retention time are important variables that affect the performance of the chamber and its ability to remove pollutants. Specific retention times are needed, specifically to allow for certain size particles to settle out to the floor. Most similar systems known in the art are unable to perform at a designed target level of one fluctuations in water levels and cannot control for the speed of which the water travels through the system (as measured in gallons/minute, or gpm/sq ft). This is particularly true in periods of high flow and fill up and drain down periods.

As described herein, flow control of the water traveling through the system solves for these problems with a combination of weirs and orifice(s) mounted before the outlet pipe.

In some embodiments, the orifices can be arranged in different positions on the weirs in order to control for the flow at different water levels.

The components of the hydrodynamic separation device can be comprised of different materials. As an example: the hydrodynamic separation device metal, plastic, concrete, fiberglass, composite, and a combination thereof. Additionally, flow weirs may be selected from a group consisting of: non-corrosive materials including: metal, plastic, concrete, fiberglass, composite, and a combination thereof. Also, inlet and outlet pipes may be selected from a group consisting of: metal, plastic, concrete, clay, or a combination thereof FIG. 1 begins to illustrate the elements of a preferred embodiment of the invention via a cut-away view, demonstrating the box structure 10, inlet pipe 1, the end of the wall box 4, the bottom of the box 6, the top of box 3, and the side wall of the box 5. The outlet end of the box 10 includes a horizontal outlet orifice 8, providing flow control throughout the box system 10. The outlet orifice 8 is located on the outlet flow control weir 7 which is connected to the exiting hole of the outlet pipe 2.

Figure 2:
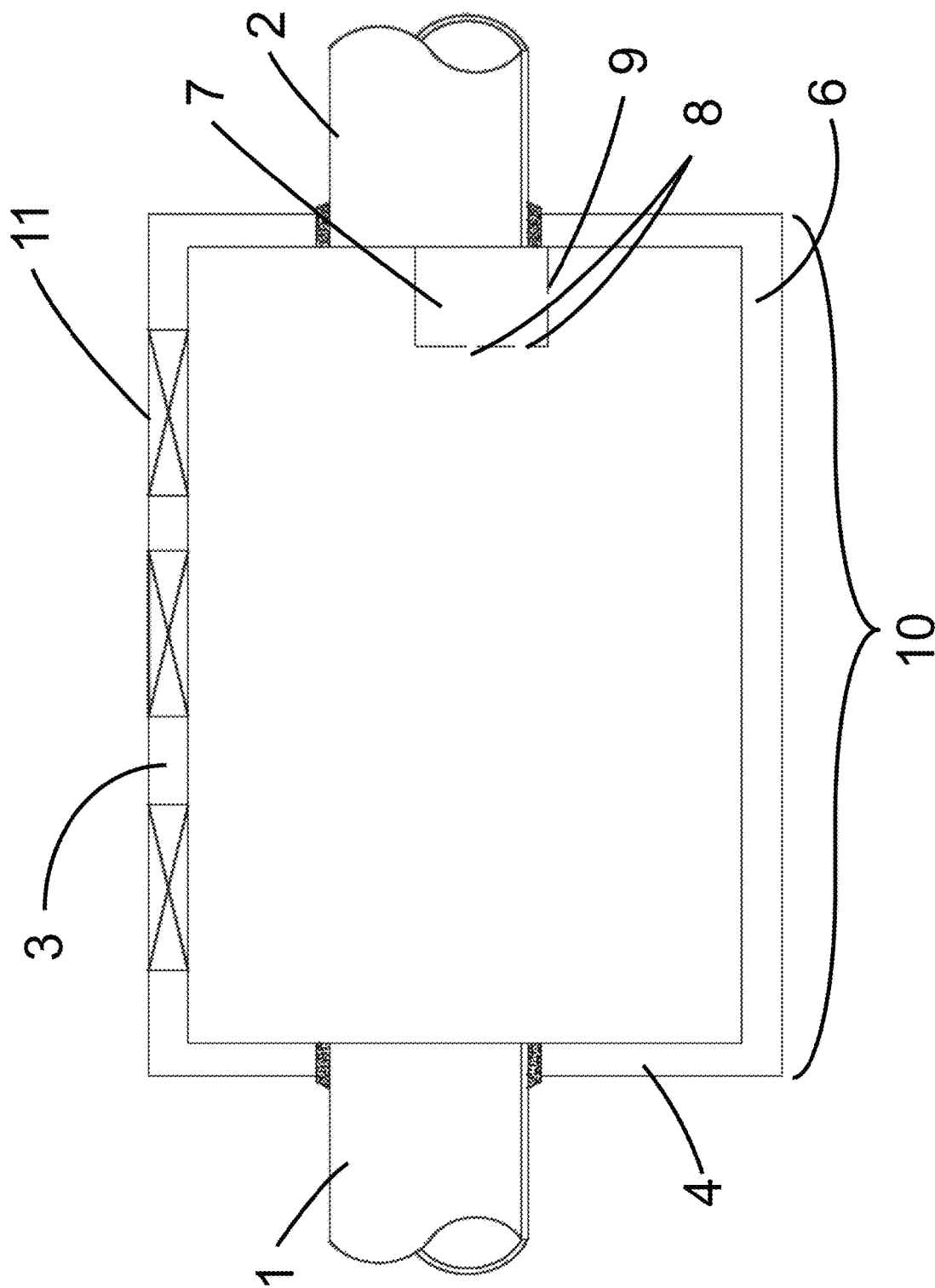
FIG. 2 is a side view of a preferred embodiment of a hydrodynamic separation device.

FIG. 2 illustrates a side view of a preferred embodiment of the box structure 10 with the inlet pipe 1 on the left side of this view and the outlet pipe 2. The walls of the box structure 10 includes the top of box 3, the end of the wall box 4, and bottom of the box 6, and access openings 11. Aligned internally to the outlet pipe 2 are the components of the outlet flow control weir 7 with outlet orifices 8, the vertical outlet orifice 9.

Figure 3:
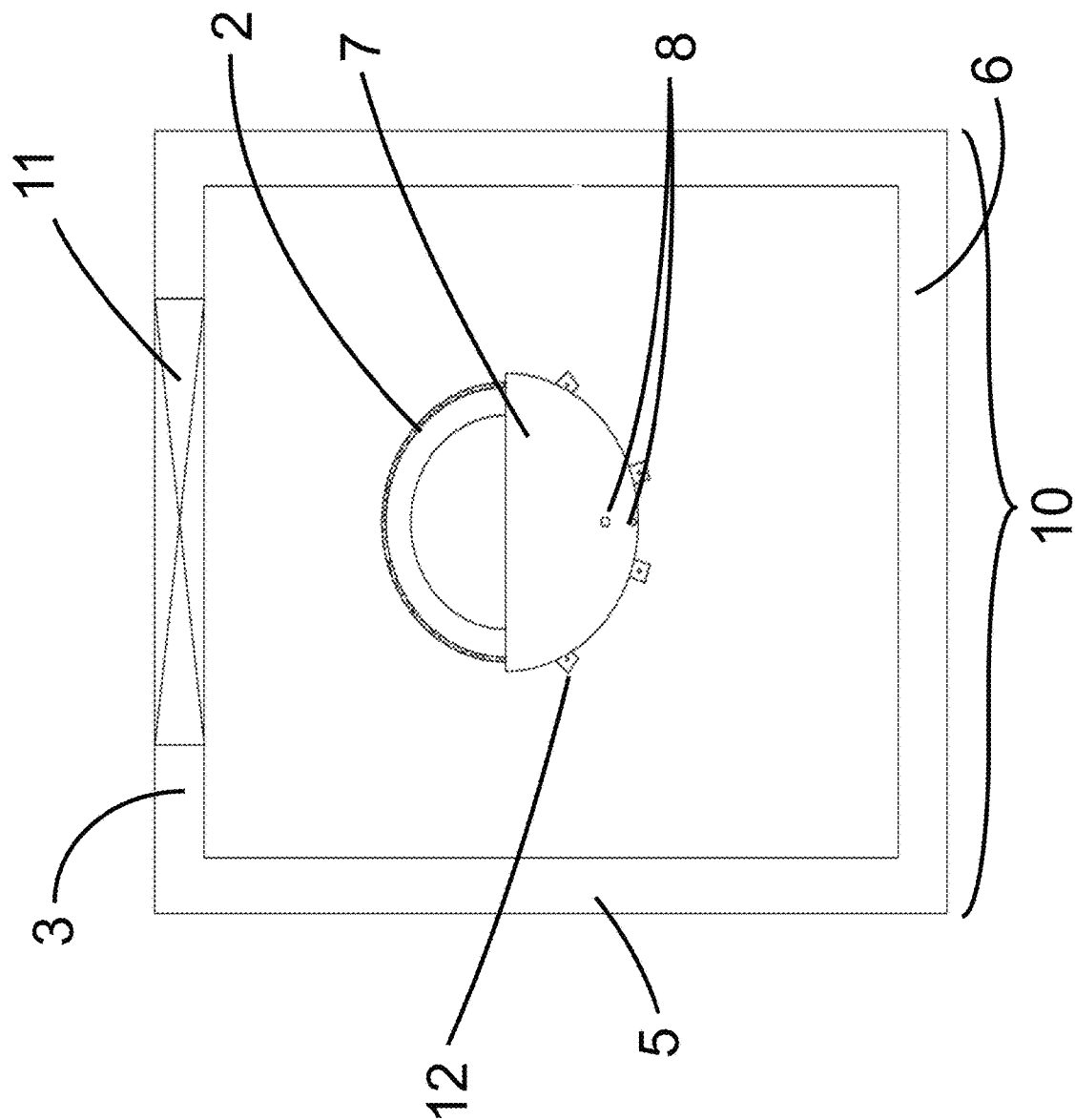
FIG. 3 is a cut-away end view of a preferred embodiment of a hydrodynamic separation device clearly identifying different potential locations of orifices on outlet weirs.

FIG. 3 illustrates a cutaway, end view of the box structure 10 highlighting the outlet flow control weir 7 with horizontal outlet orifices 8 attached to the outlet pipe 2. Also depicted is an access opening 11 on the top of box 3 of the box structure 10. The box structure 10 has side walls of the box 5 and the bottom of the box 6.

Figure 4:
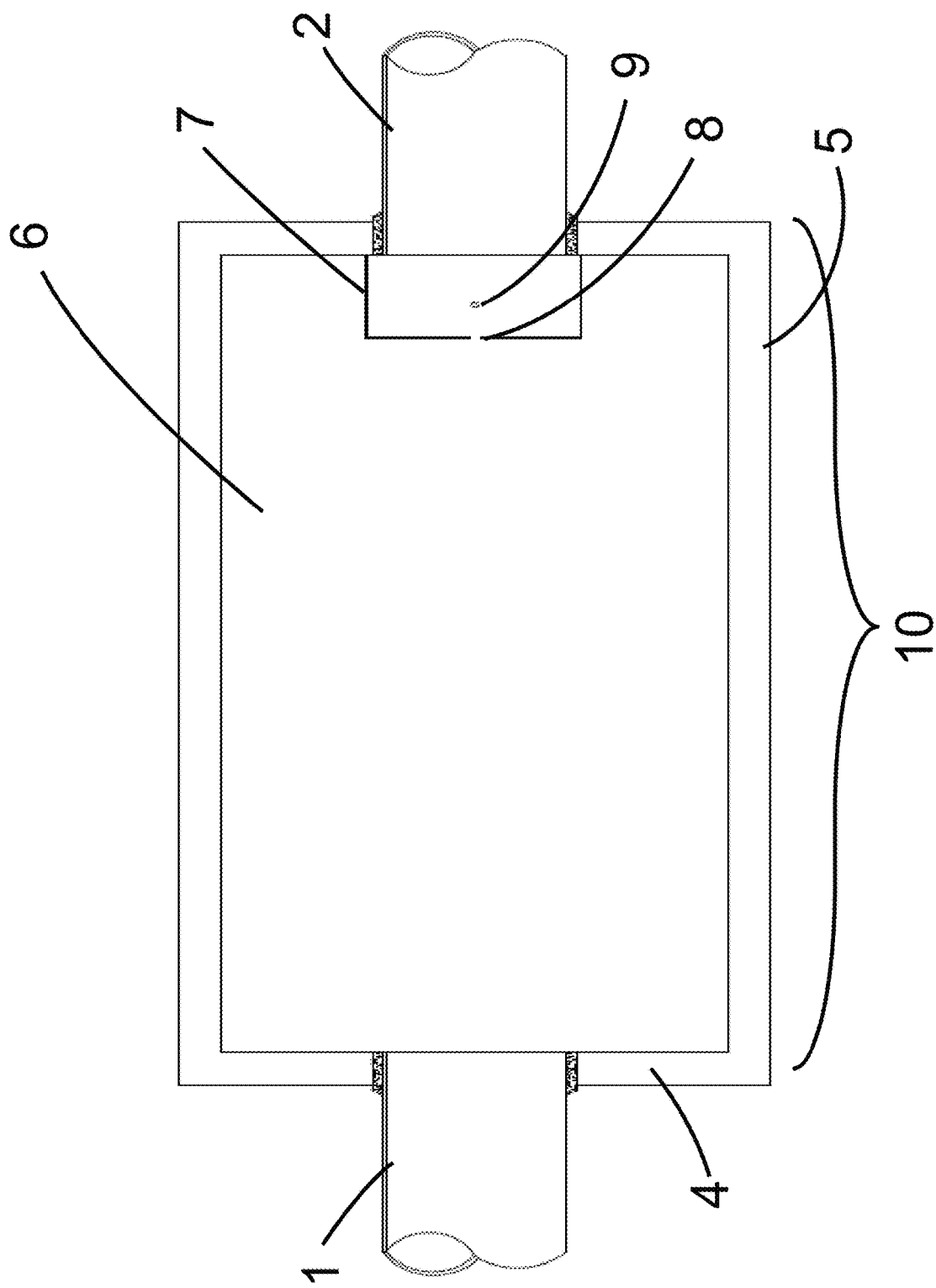
FIG. 4 is a bottom plan view of a preferred embodiment of a hydrodynamic separation device.

FIG. 4 presents the box structure 10 with the ends of the wall box 4, the bottom of the box 6, the side walls of the box 5, inlet pipe 1 and the outlet pipe 2. Also show is the outlet flow control weir 7, an outlet orifice 8, and a vertical outlet orifice 9.

Figure 5:
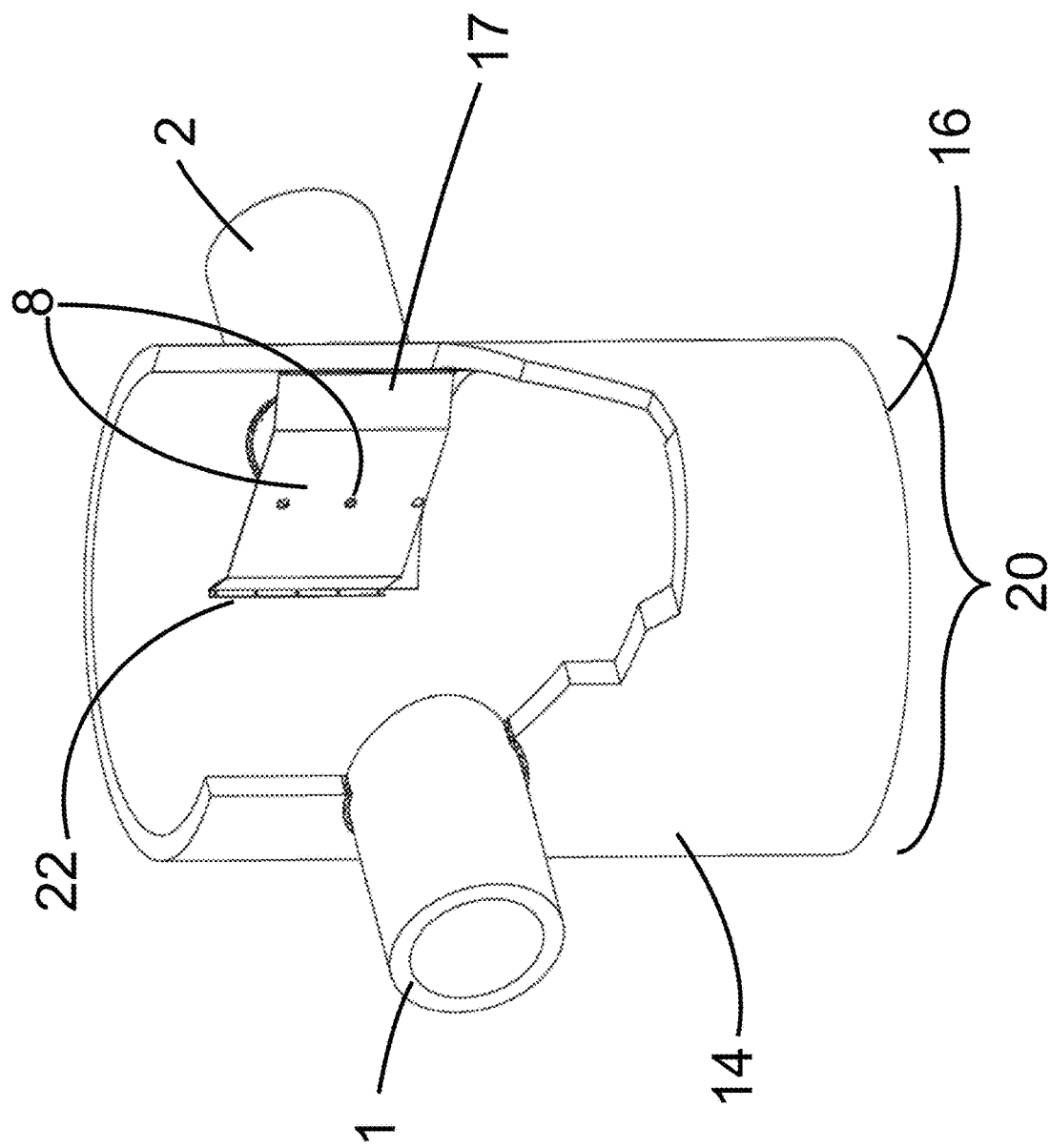
FIG. 5 is a cut-away view of an alternative shape of a preferred embodiment of a hydrodynamic separation device.

FIG. 5 presents an alternative embodiment of the outlet orifices 8 with multiple orifices. Adding one or more orifices to the outlet orifices 9 provides increases flow control to better maintain the target loading rate during different stages of water levels within the box structure 10, or as seen in this figure, the round manhole structure 20. Also depicted in FIG. 5 are the side wall of round manhole structure 14, the bottom of round manhole structure 16, an outlet flow control weir for a round structure 17, and wall mounts with vertical side flanges 22. As with the box structure 10, there is an inlet pipe 1 and the outlet pipe 2.

Figure 6:
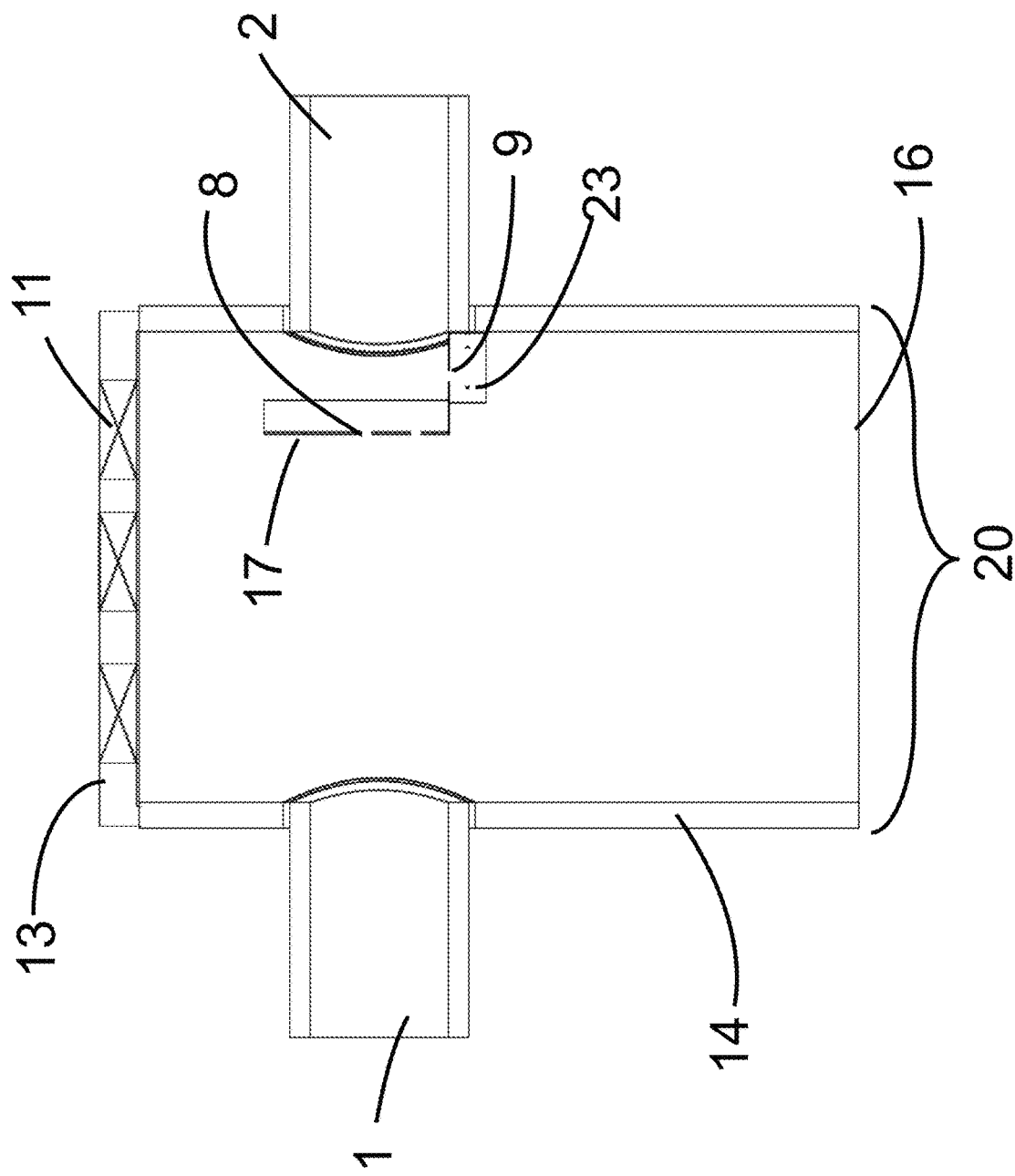
FIG. 6 is a cut-away view of cut-away view a round manhole structure as a preferred embodiment of a hydrodynamic separation device.

FIG. 6 presents a cutaway view of the round manhole structure 20 with bottom of round manhole structure 16, side walls of round manhole structure 14, an inlet pipe 1, the outlet pipe 2, and the top of manhole structure 13 with access openings 11. As presented as a preferred embodiment are the outlet flow control weir for a round structure 17 with multiple outlet orifices 8 and a vertical outlet orifice 9. The wall mount horizontal flange 23 separates the outlet flow control weir for a round structure 17 from the outlet pipe 2.

Figure 7:
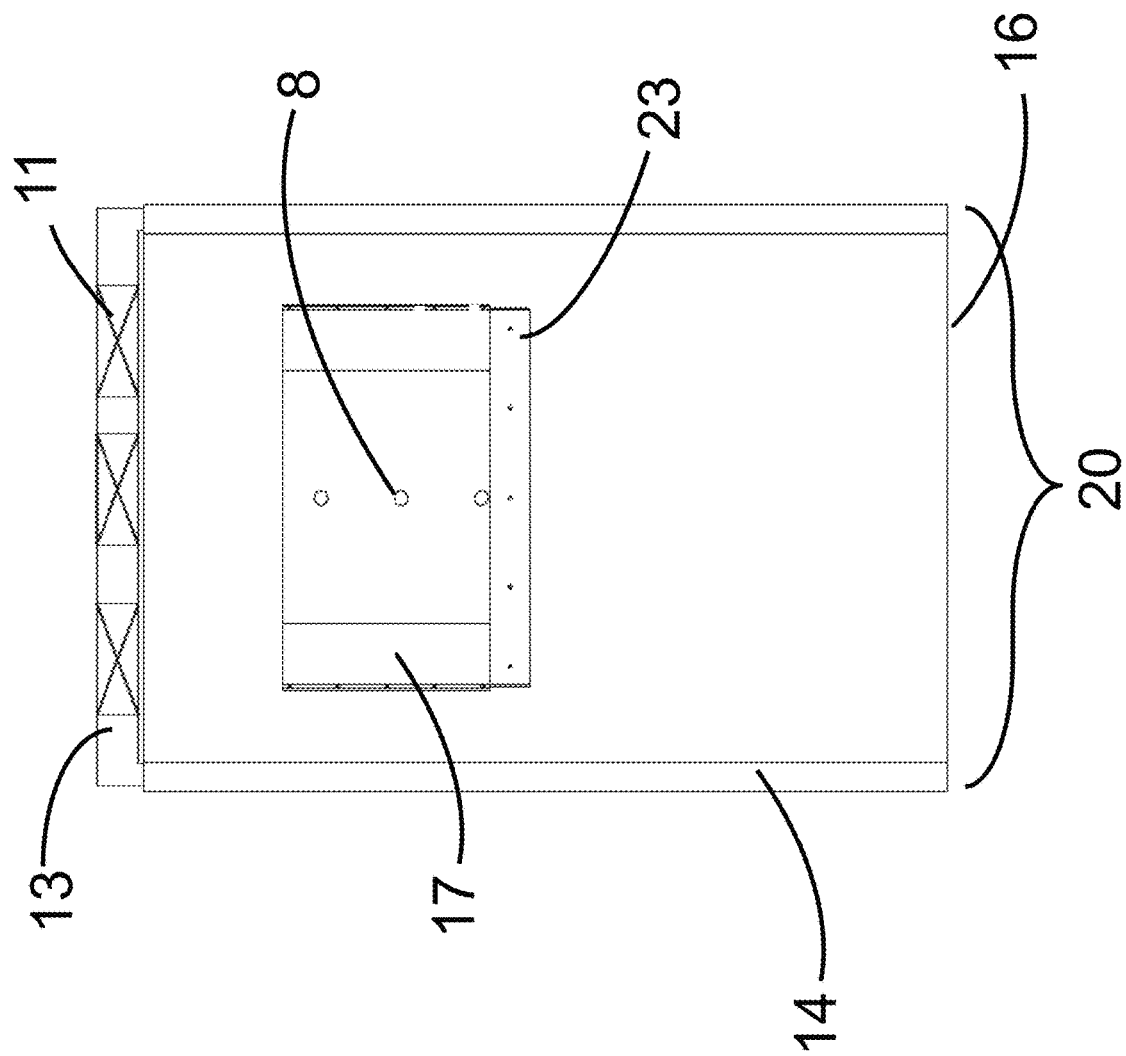
FIG. 7 is a cut-away end view of a preferred embodiment of a hydrodynamic separation device clearly identifying different potential locations of orifices on outlet weirs.

FIG. 7 isolates the outlet flow control weir for a round structure 17 with multiple outlet orifices 8 and the wall mount horizontal flange 23. Also shown is the top of manhole structure 13 with access openings 11, the side walls of round manhole structure 14 and bottom of round manhole structure 16.

Figure 8:
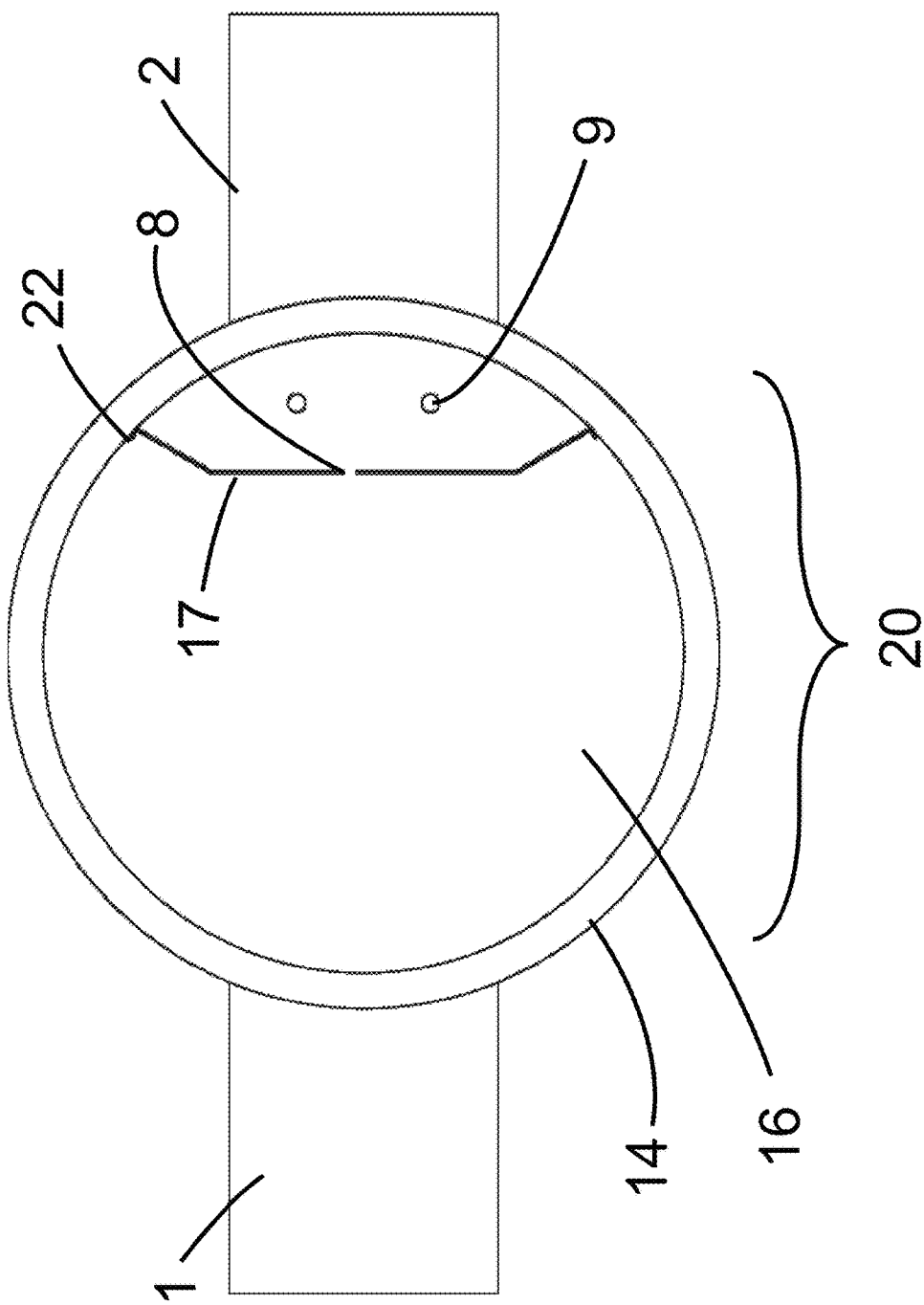
FIG. 8 is a top plan view of round manhole structure as a hydrodynamic separation device.

FIG. 8 is a top view of the round manhole structure 20 with side walls of round manhole structure 14 and bottom of round manhole structure 16. Water enters the system through an inlet pipe 1 and exits via the outlet pipe 2. Alternative embodiments may include more than one inlet pipe 1 and/or the outlet pipe 2. The outlet flow control weir for a round structure 17 and vertical outlet orifices 9 with outlet orifice 8 and wall mounts with vertical side flanges 22 are located just within the outlet pipe 2.

Figure 9:
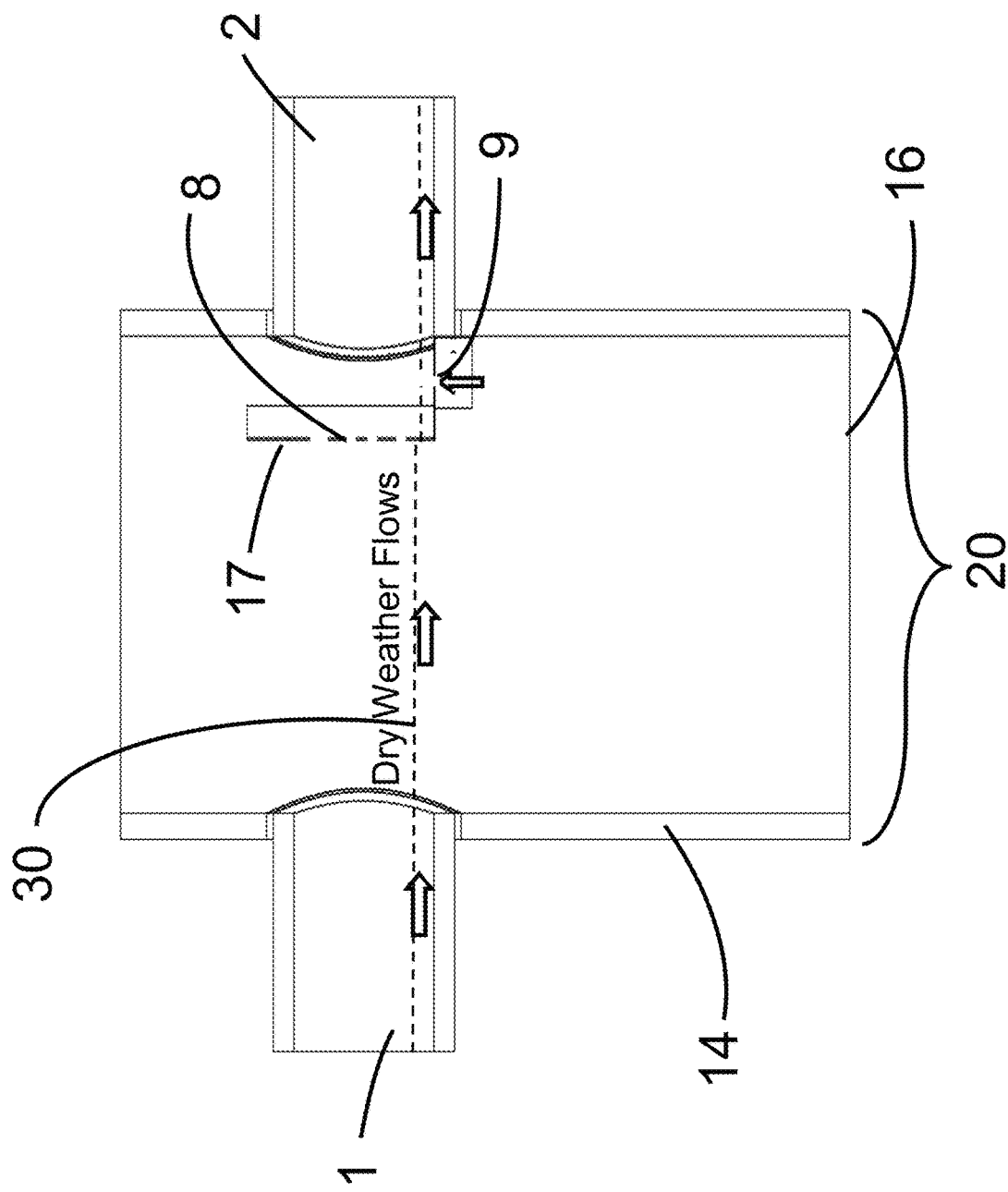
FIG. 9 is a cut-away view begins to illustrate how water flows through the hydrodynamic separation device during different conditions. In this case during dry weather flows.

FIG. 9 begins to show how water flows through the system and the value of outlet orifices 8. During periods of dry weather flows, water enters the round manhole structure 20, or alternately a box structure 10 (not shown) during a dry weather flow event 30 via the inlet pipe 1, or other inlet opening such as an access opening 11 (not shown). Within this figure of a round manhole structure 20 with side walls of round manhole structure 14 and bottom of round manhole structure 16. Also depicted is the outlet flow control weir for a round structure 17, with a horizontal outlet with multi-level orifices 8 and a vertical outlet orifice 9 attached to an outlet pipe 2.

Figure 10:
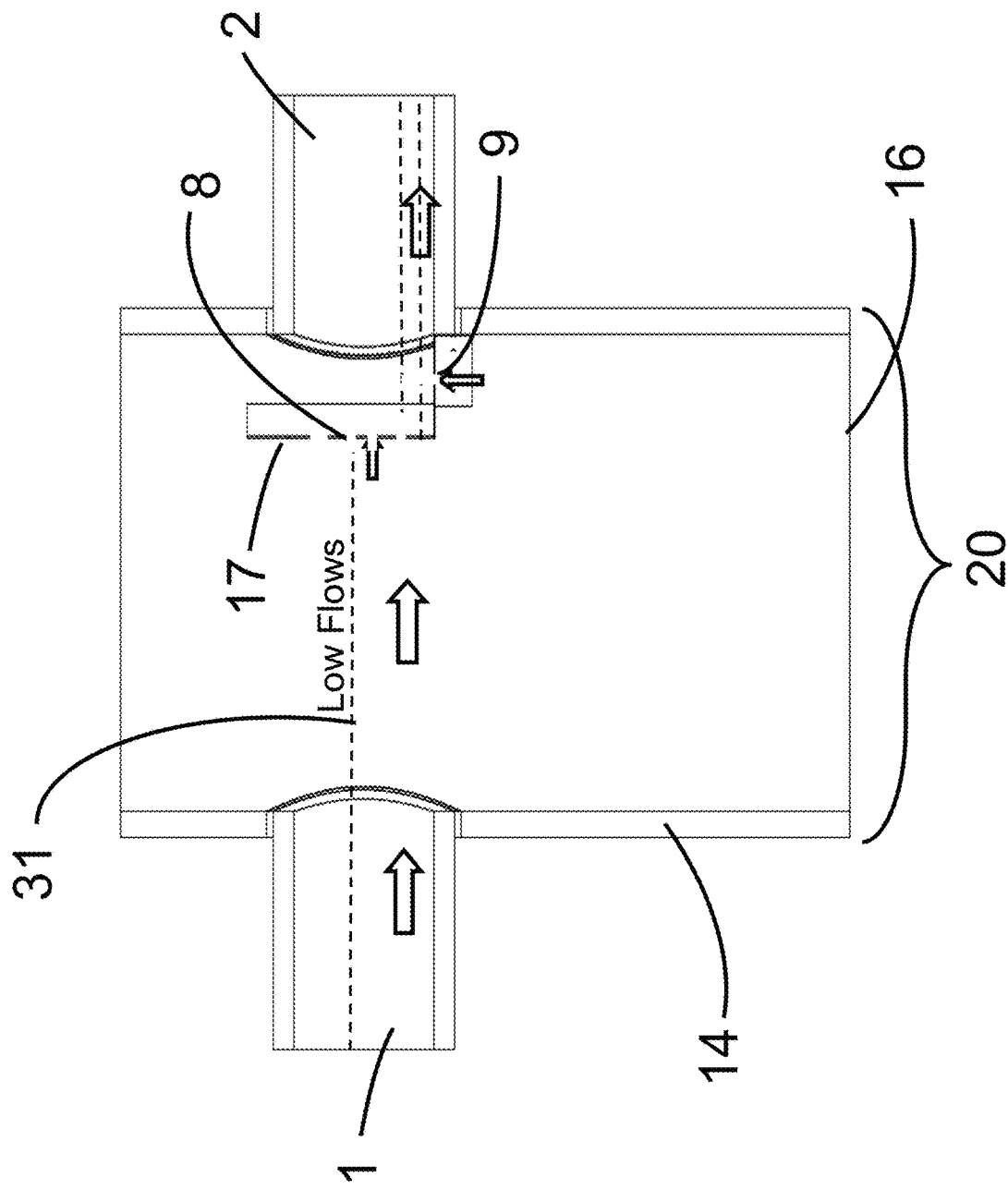
FIG. 10 is a cut-away view of low water flows through the hydrodynamic separation device.

FIG. 10 presents a similar scenario; however, with low flow movement of water levels 31. Water enters the round manhole structure 20 via the inlet pipe 1, or other inlet opening such as an access opening 11 (not shown). Within this figure of a round manhole structure 20 with side walls of round manhole structure 14 and bottom of round manhole structure 16. Also depicted is the outlet flow control weir for a round structure 17, with a horizontal outlet with multi-level orifices 8 and a vertical outlet orifice 9 attached to an outlet pipe 2.

Figure 11:
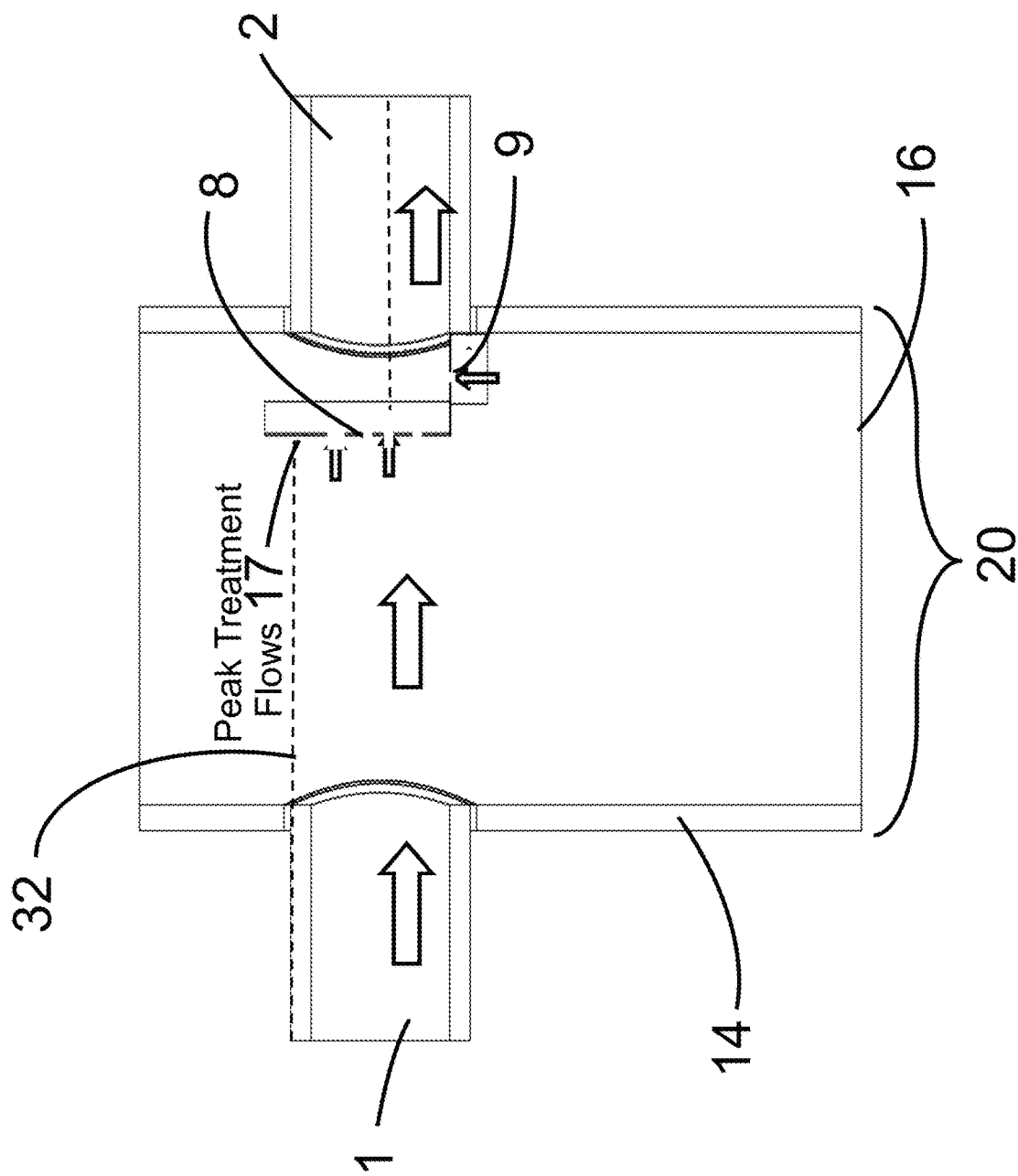
FIG. 11 is a cut-away view of a cut-away view of peak treat water flows through the hydrodynamic separation device.

FIG. 11 presents an alternate scenario where the system processes a peak treatment flow water level 32. Within this figure of a round manhole structure 20 with side walls of round manhole structure 14 and bottom of round manhole structure 16. Also depicted is the outlet flow control weir for a round structure 17, with a horizontal outlet with multi-level orifices 8 and a vertical outlet orifice 9 attached to an outlet pipe 2.

Figure 12:
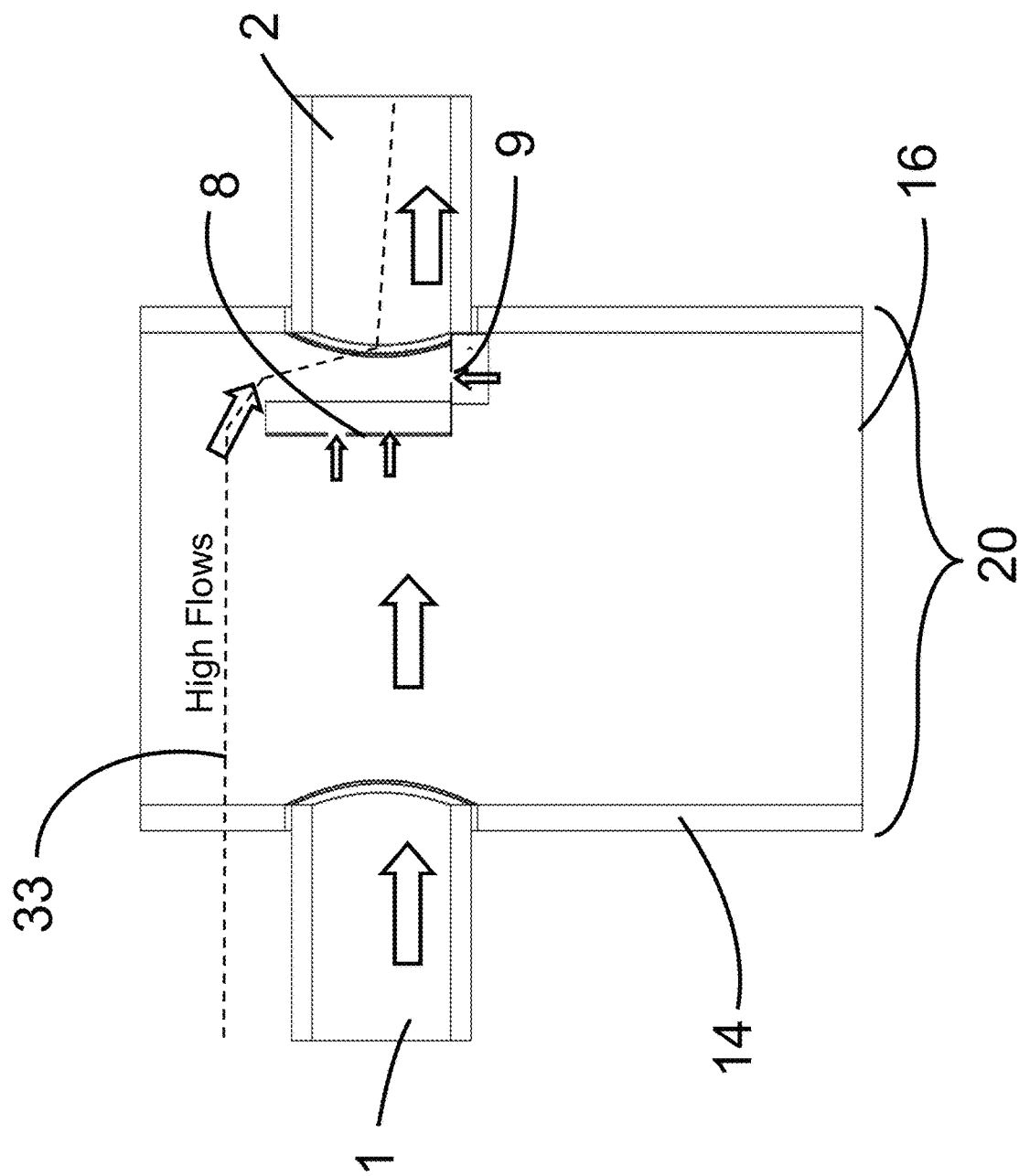
FIG. 12 is a cut-away view of a cut-away view of high water flows through the hydrodynamic separation device, resulting in a bypass.

FIG. 12 presents an alternate scenario where the system processes incoming water during high flows which incorporates a bypass flow water level 33. Within this figure of a round manhole structure 20 with side walls of round manhole structure 14 and bottom of round manhole structure 16. Also depicted is the outlet flow control weir for a round structure 17, with a horizontal outlet with multi-level orifices 8 and a vertical outlet orifice 9 attached to an outlet pipe 2.

Figure 13:
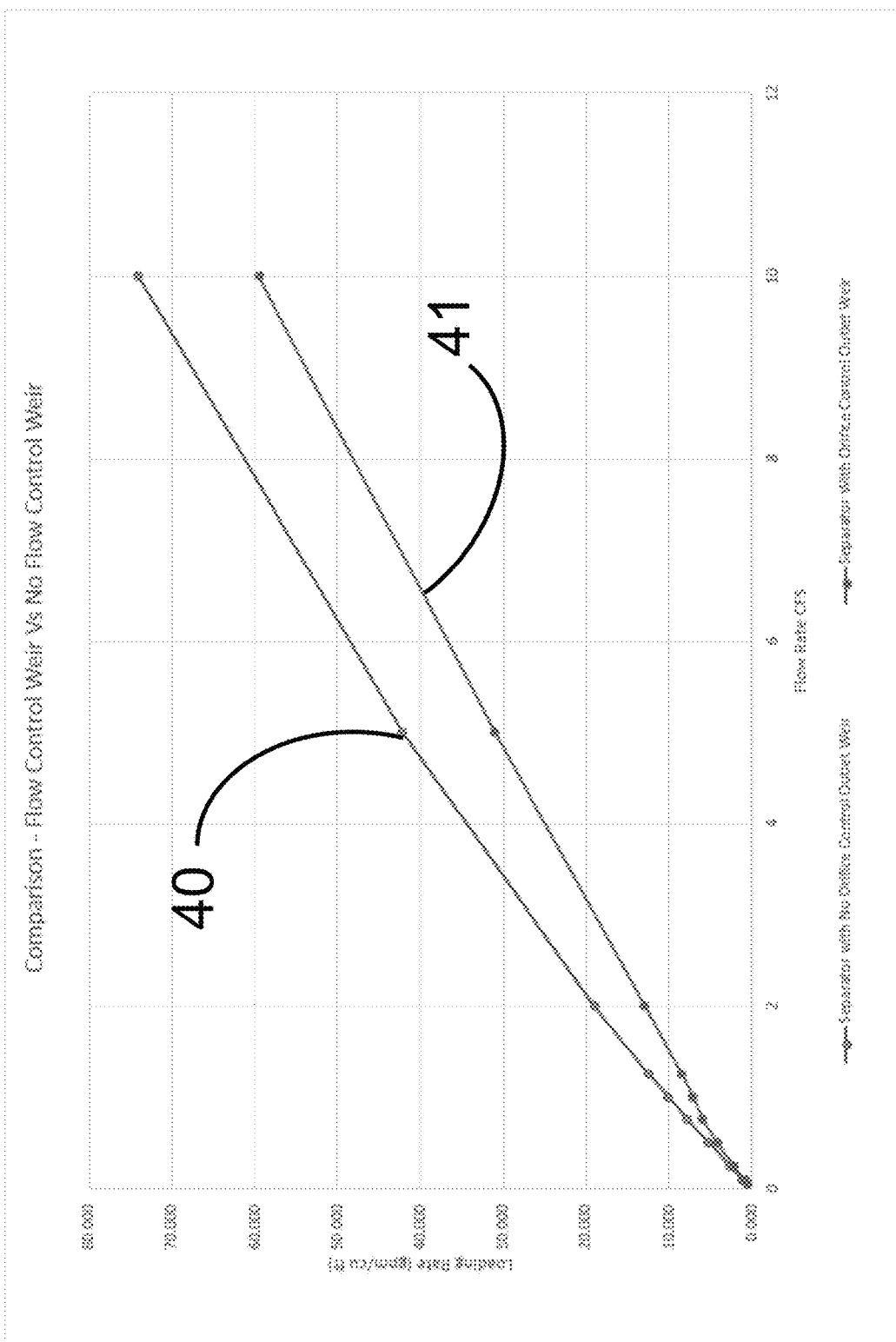
FIG. 13 presents third-party test results of the performance of a hydrodynamic separation device without orifices versus the same hydrodynamic separation device with orifices on the weirs.

FIG. 13 presents third-party test results of the performance of the comparison of the same type of hydrodynamic separation device with no orifices controlling the loading flow rate 40 in comparison to weir and orifice-controlled loading flow rate 41. The weir and orifice-controlled loading flow rate 41 meets optimal loading rates during different water level scenarios.

Figure 14:
FIG. 14 presents third-party test results of the performance of a hydrodynamic separation device without orifices versus the same hydrodynamic separation device with orifices with greater detail in the data measured.

FIG. 14 presents third-party test results of the performance further detailing the performance of a hydrodynamic separation device without an orifice control outlet weir versus a hydrodynamic separation device with an orifice control outlet weir versus. Performance is measured comparing HGL about the outlet pipe invert (measured in feet (ft)), the wet volume (cu feet) and the loading rate (gpm/cu ft).

I claim:

1. A hydrodynamic separator assembly configured for installation within a stormwater drainage infrastructure, wherein the hydrodynamic separator has substantially circular walls with a top, with one or more access openings, a bottom, at least one inlet opening and at least one outlet opening;

wherein said hydrodynamic separator, contains an outlet weir, said outlet weir with weir shelves and wall is attached to said wall of hydrodynamic separator via mounts, and positioned so that the wall of the outlet weir is disposed across the outlet opening horizontally level;

wherein the outlet weir has two or more orifices arranged in a vertical orientation, including one or more orifices on the shelf portion of the outlet weir to control water level and discharge rate at low flow conditions, one or more orifices on the wall portion of the outlet control weir to control water level and discharge rate at moderate flow conditions, and the top of the outlet weir set at a higher elevation than the orifices to control the water level at higher flows that exceed a flow capacity of the multiple orifices below;

wherein a level and size of each orifice is set and designed based upon hydraulic calculations that optimize an overall performance curve for removal of particulate pollutants over all flow ranges by increasing a volume of water to a higher level during lower flow conditions and therefore decreasing gallons per minute per cubic foot of wet volume and increasing performance.

2. The hydrodynamic separator assembly of claim 1, wherein the outlet weir is configured to provide an elongated horizontal plane diversion for treated stormwater to flow over the top;

wherein the outlet weir is comprised of a wall with two side mounts, where the side mounts extend the length of the wall; wherein the wall and side mounts connect seamlessly to a curved weir shelf; wherein said curved weir shelf has one or more outlet weir orifice control holes;

wherein the outlet weir assembly of wall, side mounts, shelf, and orifice control holes are affixed to a curved bottom mount configured to be flush with an invert curve of an inside of a sump chamber below the bottom of an outlet pipe.

3. The hydrodynamic separator assembly of claim 1, wherein casing of the assembly is selected from the group consisting of: metal, plastic, concrete, fiberglass, composite, and a combination thereof.

4. The hydrodynamic separator assembly of claim 1, wherein the flow weirs are selected from a group consisting of: non-corrosive materials including: metal, plastic, concrete, fiberglass, composite, and a combination thereof.

5. The hydrodynamic separator assembly of claim 1, wherein inlet and outlet pipes are selected from a group consisting of: metal, plastic, concrete, clay, or a combination thereof.

6. The hydrodynamic separator assembly of claim 1, wherein an overall size of the assembly has a diameter of 2 feet to 100 feet.

7. The hydrodynamic separator assembly of claim 1, wherein inlet and outlet pipes have a diameter of 2 inches to 30 feet.

8. A hydrodynamic separator assembly configured for installation within a stormwater drainage infrastructure, wherein the hydrodynamic separator has four side walls, a top, with one or more access openings, a bottom, at least one inlet opening and at least one outlet opening;

wherein said hydrodynamic separator, contains an outlet weir, said outlet weir with weir shelves and wall is attached to said wall of hydrodynamic separator via mounts, and positioned so that the wall of the outlet weir is disposed across the outlet opening horizontally level;

wherein the outlet weir has two or more orifices arranged in a vertical orientation, including one or more orifices on the shelf portion of the outlet weir to control water level and discharge rate at low flow conditions, one or more orifices on the wall portion of the outlet control weir to control water level and discharge rate at moderate flow conditions, and a top of the outlet weir set at a higher elevation than the orifices to control the water level at higher flows that exceed the flow capacity of the multiple orifices below;

wherein a level and size of each orifice is set and designed based upon hydraulic calculations that optimize an overall performance curve for removal of particulate pollutants over all flow ranges by increasing a volume of water to a higher level during lower flow conditions and therefore decreasing gallons per minute per cubic foot of wet volume and increasing performance.

9. The hydrodynamic separator assembly of claim 8, wherein the outlet weir is configured to provide an elongated horizontal plane diversion for treated stormwater to flow over the top;

wherein the outlet weir is comprised of a wall with two side mounts, where the side mounts extend the length of the wall; wherein the wall and side mounts connect seamlessly to a weir shelf; wherein said weir shelf has one or more outlet weir orifice control holes;

wherein the outlet weir assembly of wall, side mounts, shelf, and orifice control holes are affixed to a bottom mount configured to be flush with an invert of an inside of a sump chamber below the bottom of an outlet pipe.

10. The hydrodynamic separator assembly of claim 8, wherein casing of the assembly is selected from the group consisting of: metal, plastic, concrete, fiberglass, composite, and a combination thereof.

11. The hydrodynamic separator assembly of claim 8, wherein the flow weirs are selected from a group consisting of: non-corrosive materials including: metal, plastic, concrete, fiberglass, composite, and a combination thereof.

12. The hydrodynamic separator assembly of claim 8, wherein inlet and outlet pipes are selected from a group consisting of: metal, plastic, concrete, clay, or a combination thereof.

13. The hydrodynamic separator assembly of claim 8, wherein an overall size of the assembly has a diameter of 2 feet to 100 feet.

14. The hydrodynamic separator assembly of claim 8, wherein inlet and outlet pipes have a diameter of 2 inches to 30 feet.

* * * * *